United States Patent
Masuda

(10) Patent No.: US 9,268,505 B2
(45) Date of Patent: Feb. 23, 2016

(54) PROCESS MANAGEMENT SYSTEM, INFORMATION PROCESSING APPARATUS AND INFORMATION PROCESSING SYSTEM

(71) Applicant: Masaya Masuda, Kanagawa (JP)

(72) Inventor: Masaya Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/478,057

(22) Filed: Sep. 5, 2014

(65) Prior Publication Data

US 2015/0077796 A1 Mar. 19, 2015

(30) Foreign Application Priority Data

Sep. 13, 2013 (JP) ................................. 2013-191117

(51) Int. Cl.
*G06F 3/12* (2006.01)

(52) U.S. Cl.
CPC ............ *G06F 3/1203* (2013.01); *G06F 3/1222* (2013.01); *G06F 3/1239* (2013.01); *G06F 3/1287* (2013.01)

(58) Field of Classification Search
CPC ... G06F 3/1203; G06F 3/1239; G06F 3/1287; G06F 3/1222
USPC .................... 358/1.15; 705/7.13, 7.15, 34–35
See application file for complete search history.

(56) References Cited

U.S. PATENT DOCUMENTS

| 2006/0065715 | A1* | 3/2006 | Kojima et al. ................. 235/380 |
| 2012/0147420 | A1 | 6/2012 | Nishimi et al. |
| 2013/0242352 | A1* | 9/2013 | Ito ................................... 358/438 |

FOREIGN PATENT DOCUMENTS

| JP | 2000-071577 | 3/2000 |
| JP | 2008-021233 | 1/2008 |
| JP | 2009-157531 | 7/2009 |
| JP | 2012-138075 | 7/2012 |

* cited by examiner

*Primary Examiner* — Marivelisse Santiago Cordero
*Assistant Examiner* — Kevin Ky
(74) *Attorney, Agent, or Firm* — IPUSA, PLLC

(57) ABSTRACT

A process management system includes an information processing apparatus including a computer that executes a program to perform a managing process. The managing process includes managing user management information, managing coordinate organization information to manage groups of organization information, managing a process performed by processing devices by acquiring, when a user managed by organization information, upper limit management information and user information of the user who makes the process request, from a desired processing device managed by the organization information of the group of organization information, and determining whether the process requested by the user is executable within the upper limit amount of process for the user based on the acquired upper limit management information. The managing a process performed by the processing device includes determining to perform, when the process requested by the one of the users is determined to be executable, the process requested by the user.

12 Claims, 11 Drawing Sheets

TENANT INFORMATION

| TENANT ID | TENANT NAME |
|---|---|
| 10000 | UNIVERSITY A |
| 10001 | UNIVERSITY B |
| 10002 | UNIVERSITY C |
| 10003 | UNIVERSITY D |

FIG.9

USER INFORMATION

| TENANT ID | USER ID | PASSWORD | UPPER LIMIT POINT | CONSUMED POINT |
|---|---|---|---|---|
| 10000 | yamada | xxxxx | 100 | 0 |
| | satoh | xxxxx | 100 | 60 |
| | suzuki | xxxxx | 100 | 10 |
| 10001 | suzuki | xxxxx | 120 | 0 |
| | sasaki | xxxxx | 120 | 0 |
| 10002 | tanaka | xxxxx | 100 | 50 |
| | yamamoto | xxxxx | 200 | 50 |
| | ikeda | xxxxx | 200 | 20 |
| 10003 | saitoh | xxxxx | 200 | 0 |
| | hashimoto | | 120 | 10 |
| | masui | | 120 | 30 |
| | sasaki | xxxxx | 120 | 0 |
| ... | ... | ... | ... | ... |

FIG.10

COORDINATE TENANT INFORMATION

| GROUP ID | BELONGING TENANT ID |
|---|---|
| group-1000 | 10000 |
| | 10001 |
| | 10003 |
| group-1001 | 10002 |
| | 10004 |
| ... | ... |

FIG.11

UNIT COST POINT INFORMATION

| | PRINT | COPY |
|---|---|---|
| MONOCHROME | 1 | 1 |
| SINGLE COLOR | 1 | 1 |
| 2 COLOR | 2 | 2 |
| FULL COLOR | 5 | 5 |
| MONOCHROME (A3-SIZE OR LARGER) | 2 | 2 |
| SINGLE COLOR (A3-SIZE OR LARGER) | 2 | 2 |
| 2 COLOR (A3-SIZE OR LARGER) | 4 | 4 |
| FULL COLOR (A3-SIZE OR LARGER) | 10 | 10 |

FIG.12

LOG INFORMATION

| TENANT ID | USER ID | PRINT SETTING | PRINT NUMBER | PRINT PLACE (TENANT ID) |
|---|---|---|---|---|
| 10000 | yamada | MONOCHROME (A3-SIZE OR LARGER) | 1 | 10001 |
| ⋮ | ⋮ | ⋮ | ⋮ | ⋮ |

PROCESS MANAGEMENT SYSTEM, INFORMATION PROCESSING APPARATUS AND INFORMATION PROCESSING SYSTEM

CROSS-REFERENCE TO RELATED APPLICATION

The present application is based upon and claims the benefit of priority of Japanese Patent Application No. 2013-191117, filed on Sep. 13, 2013, the entire contents of which are incorporated herein by reference.

BACKGROUND OF THE INVENTION

1. Field of the Invention

The present invention generally relates to a process management system, an information processing apparatus and an information processing system.

2. Description of the Related Art

There is known a print upper-limit value managing system that uses a print upper-limit managing function to manage a print upper-limit for each user in an environment where multiple uses use a plurality of printers. Japanese Laid-Open Patent Application No. 2008-21233 discloses such a print upper-limit value managing system.

Conventionally, a print managing function provided by a print managing system is based on a technology which is supposed to be used in a private network such as a network in a university environment, a network in an office environment, etc. Accordingly, such a print management system is not supposed to provide the print management function over a plurality of organizations such as, for example, a university, a company, etc.

Thus, it is difficult for the conventional print managing system to provide a pint managing function over a plurality of organizations. Similar to the print managing system, such a situation may occur in a certain process management system providing a process managing function.

SUMMARY OF THE INVENTION

There is provided according to an aspect of the present invention a process management system including an information processing apparatus connected to a plurality of networks each of which is provided in respective one of organizations to which a plurality of users belong and having a processing device to be used by the users, each organization belonging to one of a plurality of groups. The information processing apparatus includes a computer that executes a program to perform a managing process to manage a process performed by the processing devices in the networks, the managing process including, managing user management information including organization information, user information and upper limit management information by associating with each other, the organization information for uniquely identifying each of the organizations, the user information for uniquely identifying each user of each organization, the upper limit management information for managing an upper limit of an amount of process performed by each processing device for each user, managing coordinate organization information to manage a plurality of groups of the organization information, and managing a process performed by the processing devices by acquiring, when one of the users managed by organization information managed in one of the groups of the organization information makes a process request, the upper limit management information associated with the organization information and the user information of the user who makes the process request, from a desired one of the processing devices which is managed by the organization information of the one of the groups of the organization information, and determining whether the process requested by the one of the users is executable within the upper limit amount of process given to the one of the users based on the acquired upper limit management information. The managing process performed by the processing device includes determining to perform, when the process requested by the one of the users is determined to be executable, the process requested by the one of the users.

There is provided according another aspect of the present invention an information processing apparatus connected to a plurality of networks each of which is provided in respective one of organizations to which a plurality of users belong and having a processing device to be used by the users, each organization belonging to one of a plurality of groups, the information processing apparatus comprising a computer that executes a program to perform a managing process to manage a process performed by the processing devices in the networks. The managing process includes, managing user management information including organization information, user information and upper limit management information by associating with each other, the organization information for uniquely identifying each of the organizations, the user information for uniquely identifying each user of each organization, the upper limit management information for managing an upper limit of an amount of processing performed by each processing device for each user, managing coordinate organization information to manage a plurality of groups of the organization information, and managing a process performed by the processing devices by acquiring, when one of the users managed by organization information managed in one of the groups of the organization information makes a process request, the upper limit management information associated with the organization information and the user information of the user who makes the process request, from a desired one of the information processing devices which is managed by the organization information of the one of the groups of the organization information, and determining whether the process requested by the one of the users is executable within the upper limit amount of process given to the one of the users based on the acquired upper limit management information. The managing a process performed by the processing device includes determining to perform, when the process requested by the one of the users is determined to be executable, the process requested by the one of the users.

There is provided according to a further aspect of the present invention an information processing system including an information processing apparatus connected to a plurality of networks each of which is provided in respective one of organizations to which a plurality of users belong, and a plurality of processing devices to be used by the users, each of the processing devices being connected to the information processing apparatus managed by respective one of the organizations each of which belongs to one of a plurality of groups. The information processing apparatus includes a computer that executes a program to perform a managing process to manage a process performed by the processing devices in the networks, the managing process including managing user management information including organization information, user information and upper limit management information by associating with each other, the organization information for uniquely identifying each of the organizations, the user information for uniquely identifying each user of each organization, the upper limit management information for managing an upper limit of an amount of processing performed by each processing device for each user, managing coordinate organization information to manage a plurality of groups of the organization information, and managing a process performed by the information processing devices by acquiring, when one of the users managed by organization information managed in one of the groups of the organization information makes a process request, the upper limit management information associated with the organization information and the user information of the user who makes the process request, from a desired one of the information processing devices which is managed by the organization information of the one of the groups of the organization information, and determining whether the process requested by the one of the users is executable within the upper limit amount of process given to the one of the users based on the acquired upper limit management information. The managing a process performed by the processing device includes determining to perform, when the process requested by the one of the users is determined to be executable, the process requested by the one of the users.

Other objects, features and advantages of the present invention will become more apparent from the following detailed description when read in conjunction with the accompanying drawings.

The objects and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 9 is an illustration of an example of user information

FIG. 10 is an illustration of an example of coordination tenant information;

FIG. 11 is an illustration of an example of unit cost point information;

FIG. 12 is an illustration of an example of log information;

DETAILED DESCRIPTION OF THE EMBODIMENTS

A description will now be given, with reference to the drawings, of embodiments of the present invention. Although a description is given below of a print managing function as an example of a process managing function, the function according to the embodiments is not limited to the print managing function. Moreover, although a description is given below of an example of providing the print managing function over a plurality of universities each of which is a form of an organization, the organization is not limited to a university.

First Embodiment

System Structure

Figure 1:
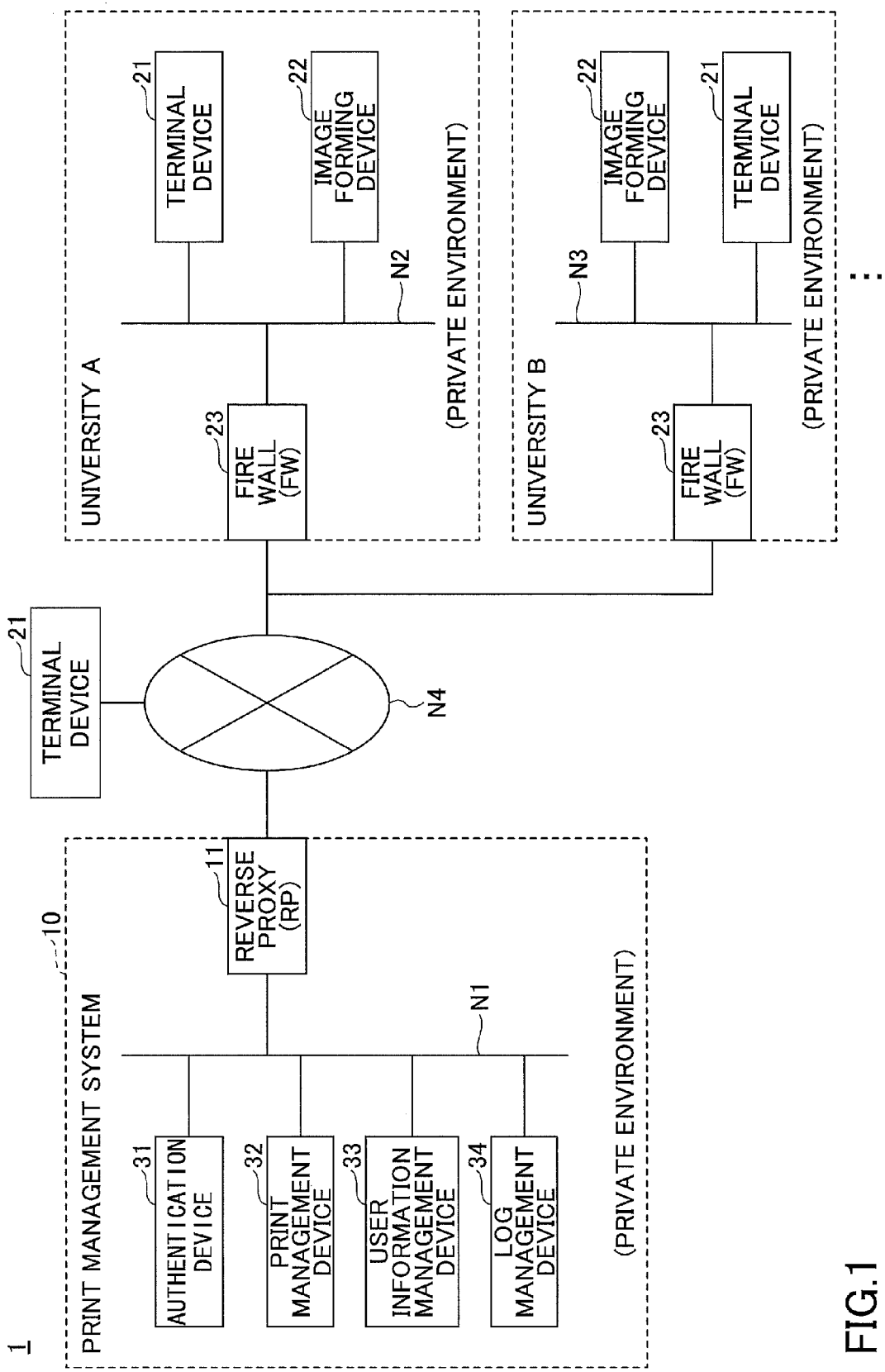
FIG. 1 is a block diagram of a structure of an information managing system according to an embodiment.

FIG. 1 is a block diagram of a structure of an information processing system according to an embodiment. An information processing system 1 illustrated in FIG. 1 includes a plurality of networks N1 through N4. The network N1 is a network in a print management system 10 represented by, for example, a cloud system. The network N2 is a private network in a university A. The network N3 is a private network in a university B. The Network N4 is a wide area network such as the Internet.

A wire wall 23 is installed in each of the network N2 of the university A and the network N3 of the university B. The wire wall 23 restricts an access of an unauthorized accessor. A reverse proxy (RP) 11 as an example of access control device is installed in the network N1 of the print management system 10. The reverse proxy 11 restricts an access through the network N4.

Each of the network N2 of the university A and the network N3 of the university B is a private network inside the fire wall 23. The network N2 of the university A and the network N3 of the university B are connected with a terminal device 21 and an image forming device 22, respectively.

The terminal device 21 can be materialized by an information processing apparatus (computer system) mounted with a general purpose operating system (OS). The terminal device 21 is a personal computer (PC), a tablet-type PC, notebook-type PC, a smartphone, a cellular phone, etc., which are operable by a user.

The image forming device 22 is an apparatus or machine that provides an image forming function, such as a multifunctional peripheral (MFP), a copy machine, a scanner, a laser printer, etc. Each of the terminal device 21 and the image forming device 22 includes a communication device using radiofrequency communication or wired communication. Although only one terminal device 21 and only one image forming device are illustrated in FIG. 1, a plurality of terminal devices and a plurality of image forming devices may be provided in the networks N2 and N3, respectively.

The print management system 10 is a system constructed by a provider of providing a cloud service through the network N4. Although a cloud service is explained as an example in the present embodiment, the present embodiment is applicable to a service provided through the network N4, such as, a service provided by an application service provider (ASP) or a Web service. The network N1 of the print management system 10 is connected to the network N4 through the reverse proxy 11.

The network N1 is connected with an authentication device 31, a print management device 32, a user information management device 33 and a log management device 34. The authentication device 31, the print management device 32, the user information management device 33 and the log management device 34 will be described in detail later.

The reverse proxy 11, the authentication device 31 and the print management device 32 provided in the print management system 10 are materialized by one or more information processing apparatuses. That is, each device in the print management system 10 may be materialized by processing performed by a single information processing apparatus, or may be materialized by distributed processing performed by a plurality of information processing apparatuses.

Moreover, each device in the print management system 10 may be materialized by being integrated in a single computer. That is, the number of information processing units constituting each device in the print management system 10 does not limit an applicable range of the present embodiment.

Furthermore, a part of or entire device in the print management system 10 may be materialized in a network other than the network N1 of the print management system. The information processing system 1 according to the present embodiment is mere an example.

For example, the applicable range of the present embodiment is not limited by whether the fire wall 23 exists between the print management system 10 and each device provided in each of the networks N2 and N3, which device can make an access to the print management system 10 to use the print managing function.

The network N4 such as the Internet is connected with the terminal device 21. As illustrated in FIG. 1, the terminal device 21 may be connected to a network other than the network N2 in the university A and the network N3 in the university B. In the information processing system 1 illustrated in FIG. 1, the terminal device 21 is connected to the network N2 in the university A, another terminal device 21 is connected to the network N3 in the university B, and a further terminal device 21 is connected to the network N4 such as the Internet.

The image forming device 22 is a device for providing a process (function) responding to a process request made by a user. The image forming device 22 is an example of a user usable device which is usable by a user. The print management device 32 is an example of a use control device to manage and control use of a function provided to a user.

<Hardware Structure>

Figure 2:
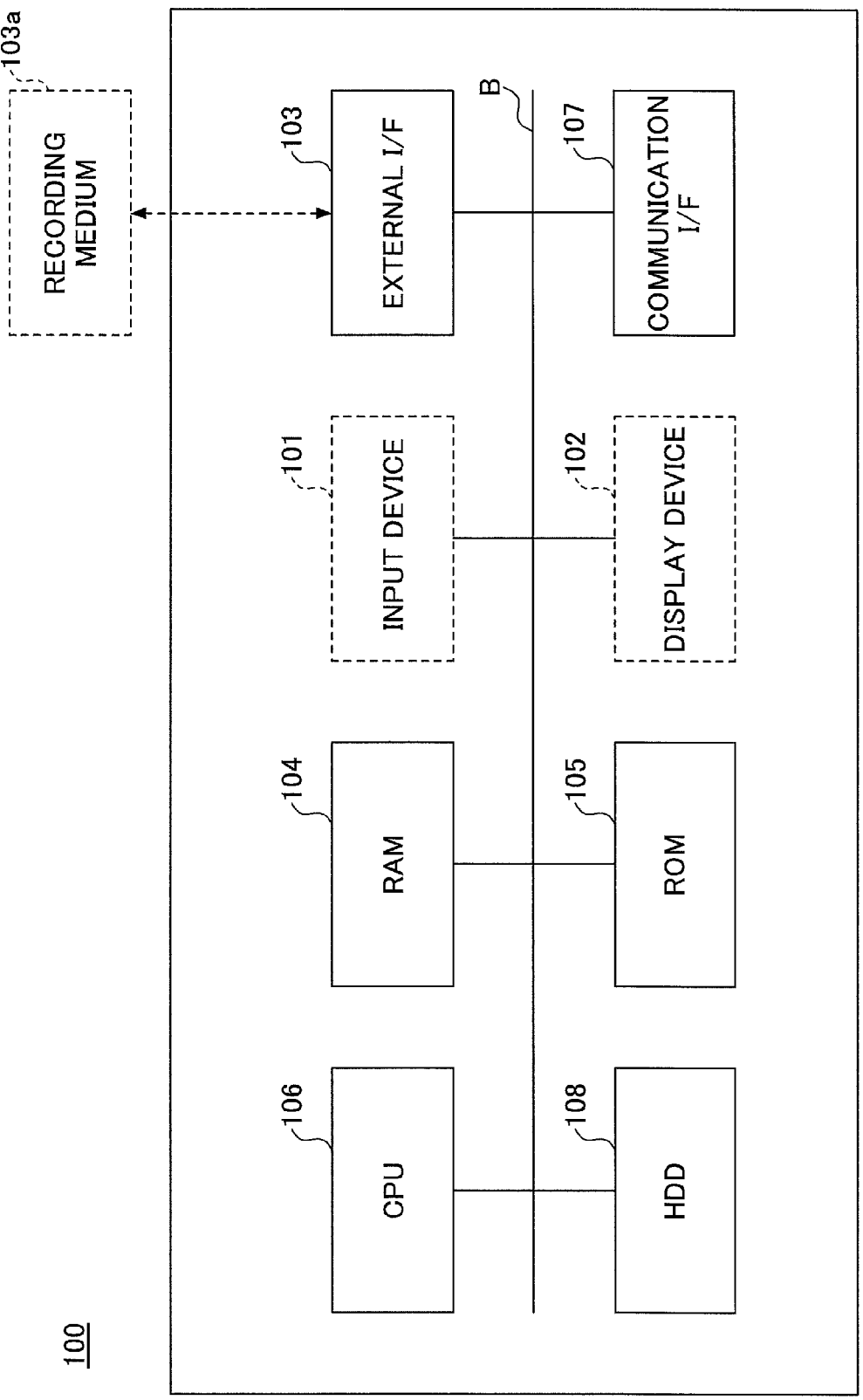
FIG. 2 is a block diagram of a hardware structure of a computer system according to the embodiment.

Each of the terminal device 21 and the fire wall (FW) 23 illustrated in FIG. 1 is materialized by a computer system having a hardware structure as illustrated in FIG. 2. Similarly, each of the reverse proxy 11, the authentication device 31, the pint management device 32, the user information management device 33 and the log management device 34 illustrated in FIG. 1 is also materialized by, for example, the computer system as illustrated in FIG. 2. FIG. 2 illustrates a block diagram of a hardware structure of the computer system according to the present embodiment.

The computer system 100 illustrated in FIG. 2 includes an input device 101, a display device 102, an external I/F 103, a RAM 104, a ROM 105, a CPU 106, a communication I/F 107, an HDD 108, etc., that are mutually connected by a bus B. The input device 101 and the display device 102 may be connected to use if needed.

The input device 101 includes a keyboard, a mouse, a touch panel, etc., to be used by a user to input operation signals. The display device 102 includes a display unit to display a result of processing performed by the computer system 100.

The communication I/F 107 is an interface to connect the computer system 100 to the networks N1 through N4. Accordingly, the computer system 100 is capable of performing data communication with external devices through the communication I/F 107.

The HDD 108 is a nonvolatile storage device for storing programs and data. The programs and data stored in the HDD 108 include an operating system (OS), which is basic software for controlling, for example, the entire computer system 100, and application software providing various functions on the OS.

The external I/F 103 is an interface with an external device such as, for example, a recording medium 103a. Thus, the computer system 100 is capable of reading data from and/or writing data on the recording medium 103 through the external I/F 103. The recording medium 103a includes a flexible disk, a CD, a DVD, an SD memory card, a USB memory, etc.

The ROM 105 is a non-volatile semiconductor memory (storage device) which can retain programs and data even when a power is turned off. The ROM 105 stores programs and data, such as BIOS performed when booting the computer system 11 and a program for setting an OS and a network. The RAM 104 is a non-volatile semiconductor memory (storage device) for temporarily retain programs and data.

The CPU 106 is an operation device for realizing a control and function of the entire computer system 100 by reading programs and data from the storage device such as the ROM 105 and the HDD 108 and performing a process based on the read programs and data.

Figure 3:
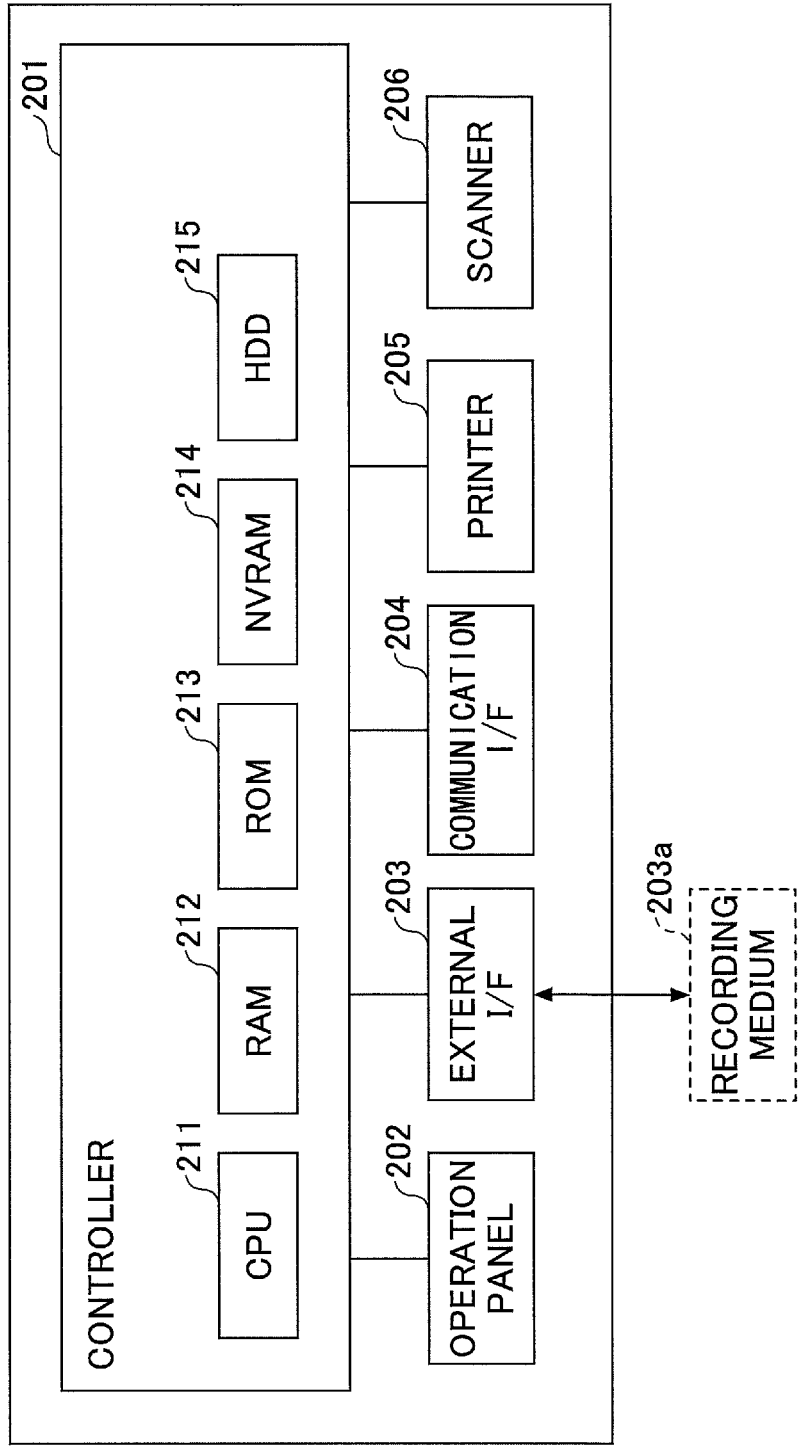
FIG. 3 is a block diagram of a hardware structure of an image forming device according to the embodiment.

The image forming device 22 illustrated in FIG. 1 is materialized by a computer system having a hardware structure such as, for example, illustrated in FIG. 3. FIG. 3 is a block diagram of a hardware structure of an image forming device according to the present embodiment. The image forming device illustrated in FIG. 3 includes a controller 201, an operation panel 202, an external I/F 203, a communication I/F 204, a printer 205, a scanner 206, etc.

The controller 201 includes a CPU 211, a RAM 212, a ROM 213, an NVRAM 214, an HDD 215, etc. The ROM 213 stores various programs and data. The RAM 212 temporarily stores programs and data. The NVRAM 214 stores, for example, setting information and the like. The HDD 215 stored various programs and data.

The CPU 211 materializes a control and function of the entire image processing device 22 by reading programs and data from a storage device such as the ROM 213, the NVRAM 214 and the HDD 215 and performing a process based on the read programs and data.

The operation panel 202 includes an input part for receiving an input from a user and a display part for displaying information. The external I/F 203, is an interface with an external device such as a recording medium 203a. Accordingly, the image forming device 22 is capable of reading data from and/or writing data on the recording medium 203a through the external I/F 203. The recording medium 203a includes an IC card, a flexible disk, a CD, a DVD, an SD memory card, a USB memory, etc.

The communication I/F 204 is an interface to connect the image forming device 22 to the network N2 or N3. Accordingly, the image forming device 22 is capable of communicating with an external device through the communication I/F 204. The printer 205 is a print device for printing print data on a print sheet. The scanner 206 is a reading device for reading an image on a document and creating image data of the read image.

<Software Structure>

Figure 4:
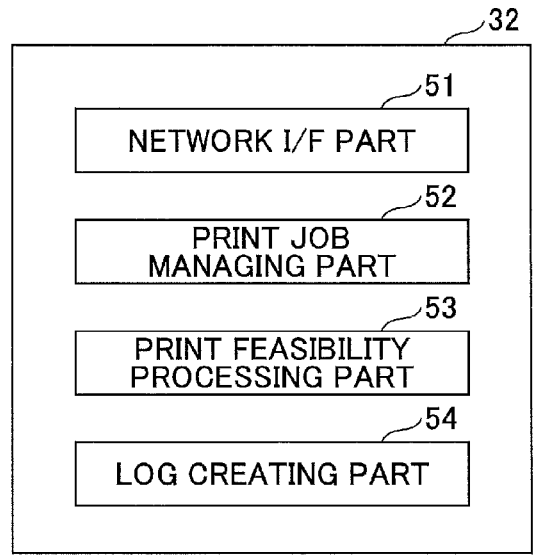
FIG. 4 is a block diagram of a functional structure of a print management apparatus according to the embodiment.

FIG. 4 is a block diagram of a functional structure of the print management device according to the present embodiment. The print management device 32 illustrated in FIG. 4 realizes a network I/F part 51, a print job managing part 52, a print feasibility determining part 53 and a log creating part 54 by executing programs.

The network I/F part 51 is a functional part that performs a communication with the terminal device for communicating with devices such as the terminal device 21 and the image forming device 22. The print job managing part 52 includes a print job managing DB (database) so as to register print data in the print job managing DB and acquire print data from the print job managing DB. The print job managing part 52 updates information stored in the print job managing DB and the user information management device 33 based on results of image printing by the image forming device 22. The print feasibility determining part 53 determines feasibility of printing by the image forming device 22 as mentioned later, and performs a print management. The log creating part 54 creates log information based on the results of printing by the image forming device 22, and sends the log information to the log management device 34 to cause the log management device 34 to manage the log information.

Figure 5:
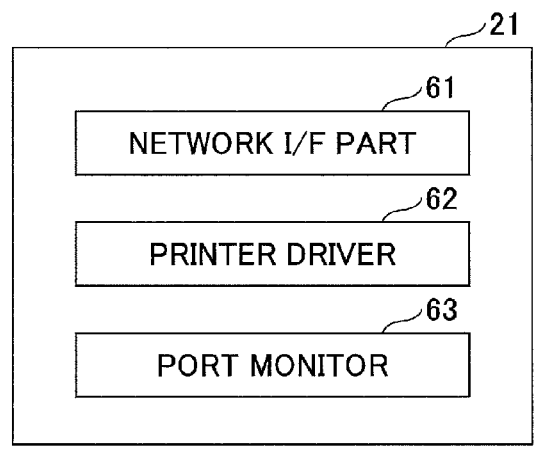
FIG. 5 is a block diagram of a functional structure of a terminal device according to the embodiment.

FIG. 5 is a block diagram of a functional structure of the terminal device according to the present embodiment. The terminal device 21 illustrated in FIG. 15 materializes a network I/F part 61, a printer driver 62 and a port monitor 63 by executing programs. The network I/F part 61 is a functional part for performing communications with each device such as the print management device 32. The printer driver 62 converts data such as application data into print data. The port monitor 63 sends the print data including information regarding print setting and a number of prints to the print management device 32.

Figure 6:
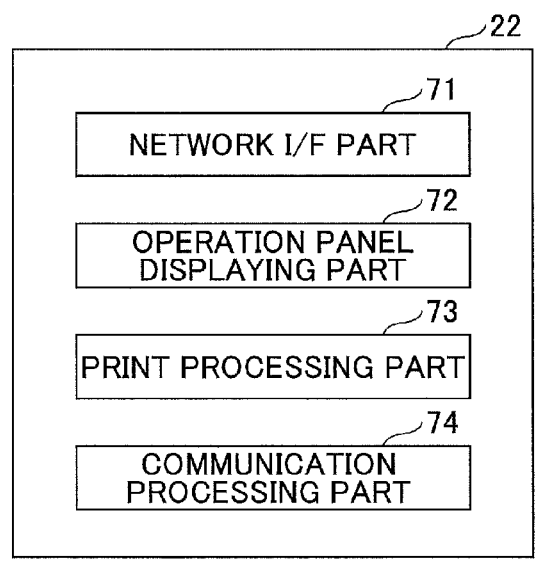
FIG. 6 is a block diagram of a functional structure of an image forming device according to the embodiment.

FIG. 6 is a block diagram of a functional structure of the image forming device according to the present embodiment. The image forming device 22 illustrated in FIG. 6 realizes a network I/F part 71, an operation panel display part 72, a print processing part 73 and a communication processing part 74 by executing programs. The network I/F part 71 is a functional part for performing communication with each device such as the print management device 32. The operation panel display part 72 controls a display on the operation panel 202. The print processing part 73 controls the printer 205 to print an image on a print paper based on the print data. The communication processing part 74 is a processing part for controlling communications with each device such as the print management device 32.

Figures 7, 8:
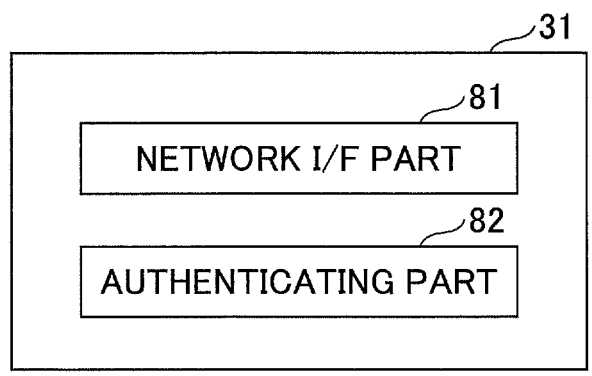
FIG. 7 is a block diagram of a functional structure of an authentication device according to the embodiment.
FIG. 8 is an illustration of an example of tenant information.

FIG. 7 is a block diagram of a functional structure of the authentication device according to the present embodiment. The authentication device 31 illustrated in FIG. 7 materializes a network I/F part 81 and an authenticating part 82 by executing programs. The network I/F part 81 is a functional part for performing communications with each device such as the terminal device 21 and the image forming device 22. The authenticating part 82 receives authentication information form the terminal device 22 and the image forming device 22 to authenticate the authentication information. If the authentication ends in success, the authenticating part 82 issues an authentication ticket.

<Data Structure>

FIG. 8 is an illustration of an example of tenant information. The tenant information is stored in, for example, the user information management device 33. The tenant information contains a tenant ID and a tenant name in association with each other. The tenant ID is identification information for uniquely identifying organizations and groups such as a university and a company. The tenant name is a name of each organization and group.

FIG. 9 is an illustration of an example of user information. The user information is stored in, for example, the user information management device 33. The user information contains a tenant ID, a user ID, a password, an upper limit point, a consumed point, etc., as items of each user. The tenant ID is identification information for uniquely identifying organizations and groups. The user information is used for managing information of each user on an individual tenant ID basis.

The user ID and the password are authentication information used for user authentication when logging in the print management system 10. The user ID may be a user name or may be information by which a user can be identifies when logging in the print management system 10. The user ID may be a card ID of an IC card carried by the user or a terminal ID of a portable terminal device carried by the user.

The upper limit point indicates an upper limit value for a number of points which each user can consume for a predetermined period of time (for example, one month). The points are consumed in response to a print setting and a number of prints for each time when each user uses the image forming device 22. The consumed point indicates a number of points consumed by each user for a predetermined period of time (for example, one month). Each user can use the image forming device 22 while consuming the points until the consumed point reaches the upper limit point.

FIG. 10 is an illustration of an example of coordinate tenant information. The coordinate tenant information is stored in, for example, in the user information management device 33. The coordinate tenant information indicates groups of coordinating organizations, and contains group ID and belonging tenant ID in association with each other. The group ID indicates a group of coordinating organizations. The belonging tenant ID indicates a tenant ID of the organization such as a university belonging to a group of the organizations identified by the group ID.

FIG. 11 is an illustration of an example of unit cost point information. The unit cost point information is stored in, for example, the user information management device 33. The unit cost point information indicates a unit cost point (a number of points consumed for each sheet), which are consumed when each user uses the image forming device 22, for each print setting or for each copy setting. The unit cost point information illustrated in FIG. 11 is an example of the number of points required for printing or copying one side of a print paper. The unit cost point illustrated in FIG. 11 is an example in which the required number of points differs between a print paper having a size smaller than A3-size and a print paper having a size larger than or equal to A3-size.

FIG. 12 is an illustration of an example of log information. The log information is stored in, for example, the log management device 34. The log information contains results of printing or copying when each user uses the image forming device 22. FIG. 12 illustrates the log information containing results of printing. The log information contains a tenant ID, a user ID, a print setting, a printed sheet number, a printing place, etc., as items.

The tenant ID and the user ID are identification information for identifying the user who uses the image forming device 22. The print setting indicates a setting for printing when printing is performed using the image forming device 22. The printed sheet number indicates a number of sheets used in the printing performed by the image forming device 22. The printing place indicates a tenant ID of an organization or a group in which the image forming device 22, which is used to perform the printing, is installed. For example, the log information of FIG. 12 indicates print results of printing performed by the image forming device 22 provided in the university B identified by the tenant ID "10001", which printing is requested by a user of the university A identified by the tenant ID "10000" and the user ID "yamada".

By using the log information illustrated in FIG. 12, a company or the like providing the image forming device 22 can perform an operation to charge a replenishment cost for consumables (print sheets and toner) and a quantitative charging amount on an individual organization (university) basis.

<Detail of Process>

A description is given below of details of the information processing system 1 according to the present embodiment. Here, a description is given of a so-called pull-print process according to which a job is registered in the print management system 10 from the terminal device 21 and the image forming device 22 acquire the job from the print management system 10 to perform printing.

<<Registering Job in Print Management System from Terminal Device>>

Figure 13:
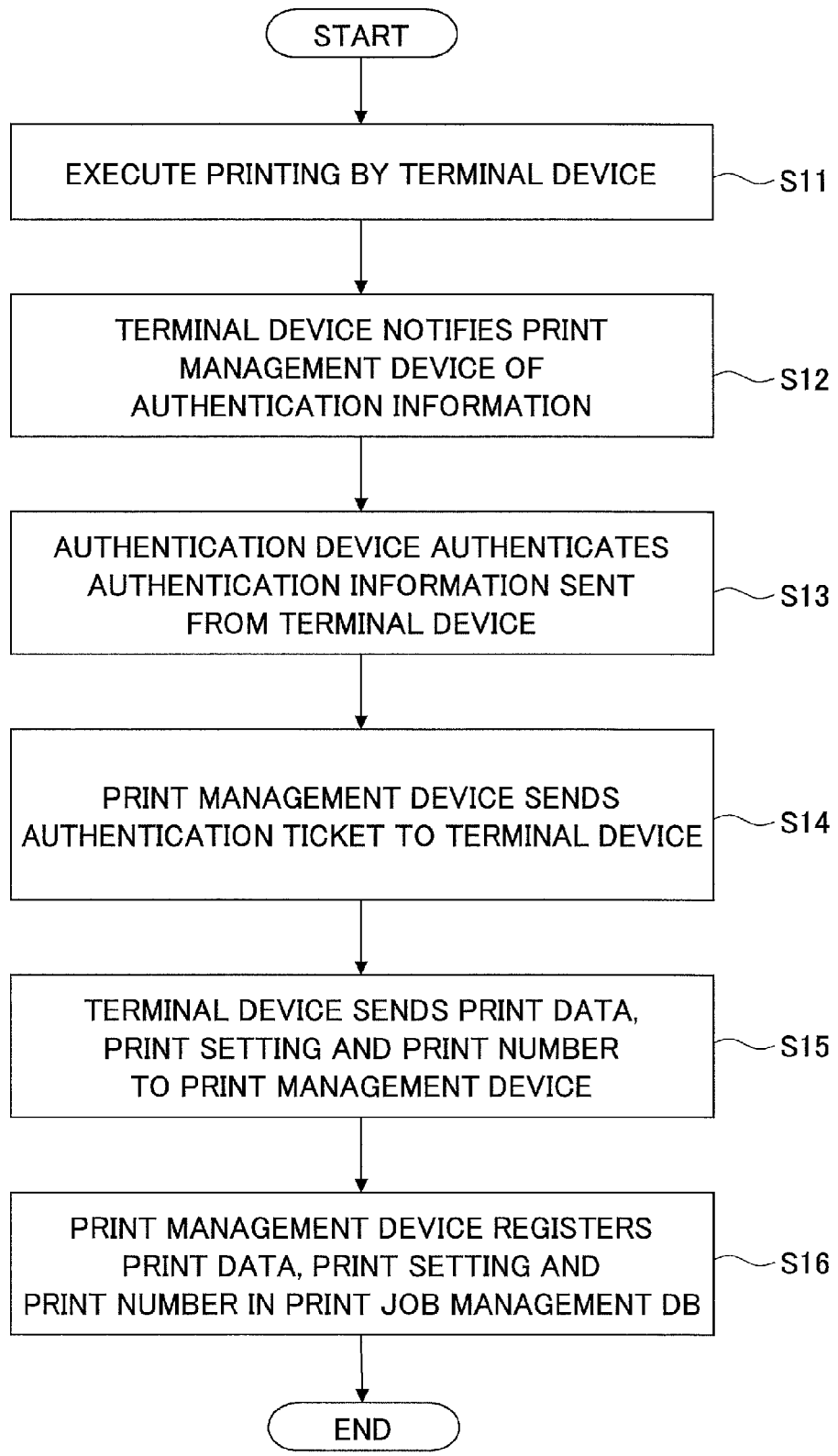
FIG. 13 is a flowchart of a job registering process.

FIG. 13 is a flowchart of a job registering process. A user operates the terminal device 21 to request a printing operation from an application mounted in the terminal device 21. The terminal device 21 receives, in step S11, the request for printing operation from the user. The printer driver 62 of the terminal device 21 converts data such as application data into print data.

The port monitor 63 of the terminal device 21 sends, in step S12, a notification of authentication information (tenant ID, user ID, password, etc.) to the print management device 32 of the print management system 10 to request an authentication. The authentication information may be input before the process of step S11 or may be input after the process of step S11. The description is continued on the assumption that the authentication information is input before the process of step S11.

The reverse proxy 11 of the print management system 10 causes the terminal device 21 to access the authentication device 31 because the print management system 10 does not have the authentication ticket. The authenticating part 82 of the authentication device 31 receives, in step S13, the authentication information (tenant ID, User ID, password, etc.) sent from the terminal device 21. The authenticating part 82 authenticates the received authentication information. If the authentication information sent form the terminal device 21 has been registered in the user information illustrated in FIG. 9, the authenticating part 82 determines that the user identified in the authentication information is an authorized user, and ends the authentication in success. When the authentication is successful, the authenticating part 82 issues an authentication thicket.

The reverse proxy 11 of the print management system 10 causes, in step S14, the terminal device 21 to which the authentication ticket is issued to access the print management device 32. The print job managing part 52 of the print management device 32 sends the authentication ticket to the terminal device 21, which has accessed the print management device 32.

The port monitor 63 of the terminal device 21 sends, in step S15, the print data, the print setting and the print number to the print management device 32 based on the request for printing operation in step S11. Then, the print job managing part 52 of the print management device 32 registers, in step S16, the print job (print data, print setting, print number, etc.) received from the terminal device 21 in the print job managing DB by associating the tenant ID and the user ID of the authenticated user with each other.

According to the job registering process illustrated in FIG. 13, the user can register the print job in the print management system 10 from the terminal device 21.

Figure 14A:
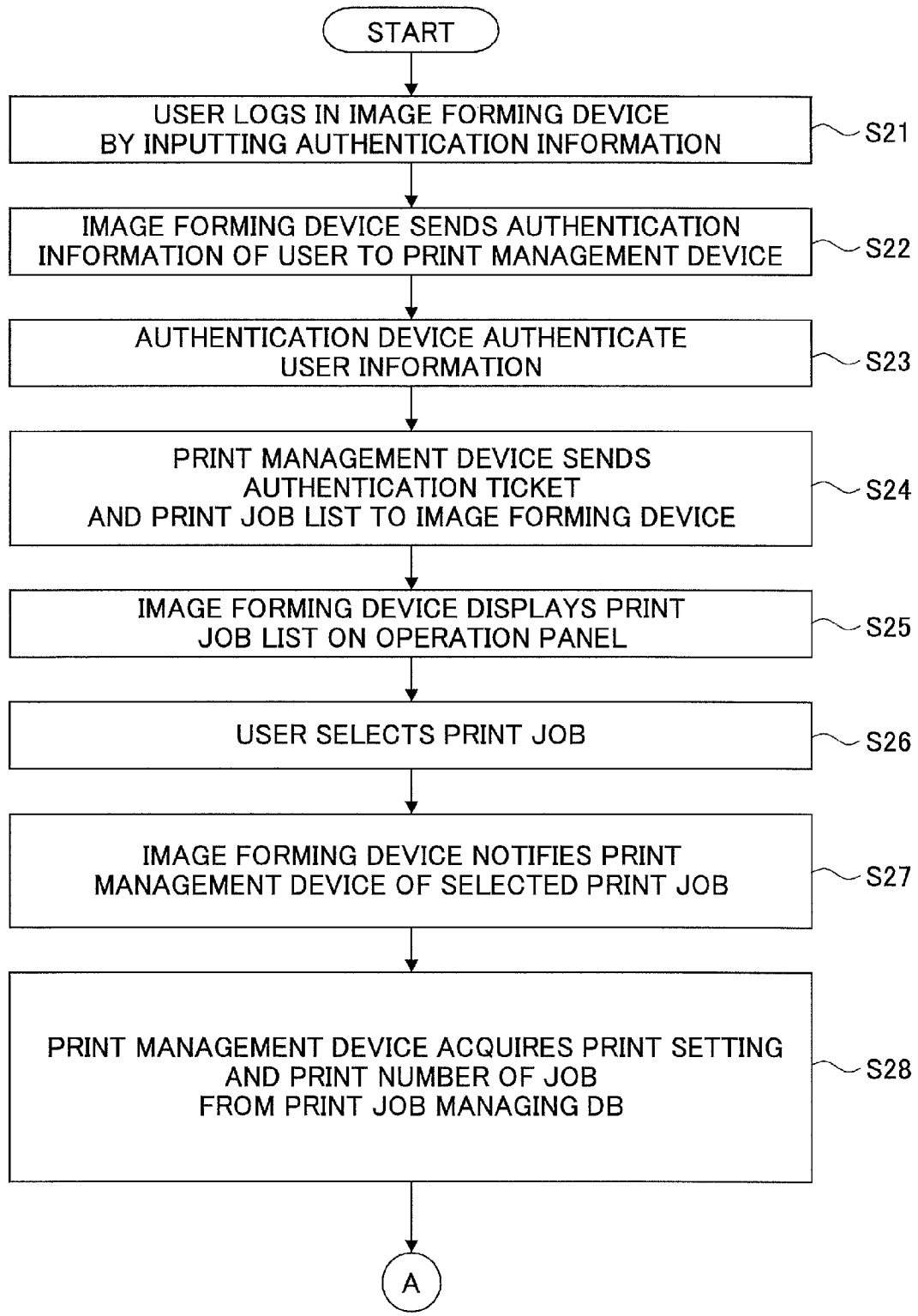
FIG. 14A is a part of a flowchart of a job acquiring and printing process.
Figure 14B:
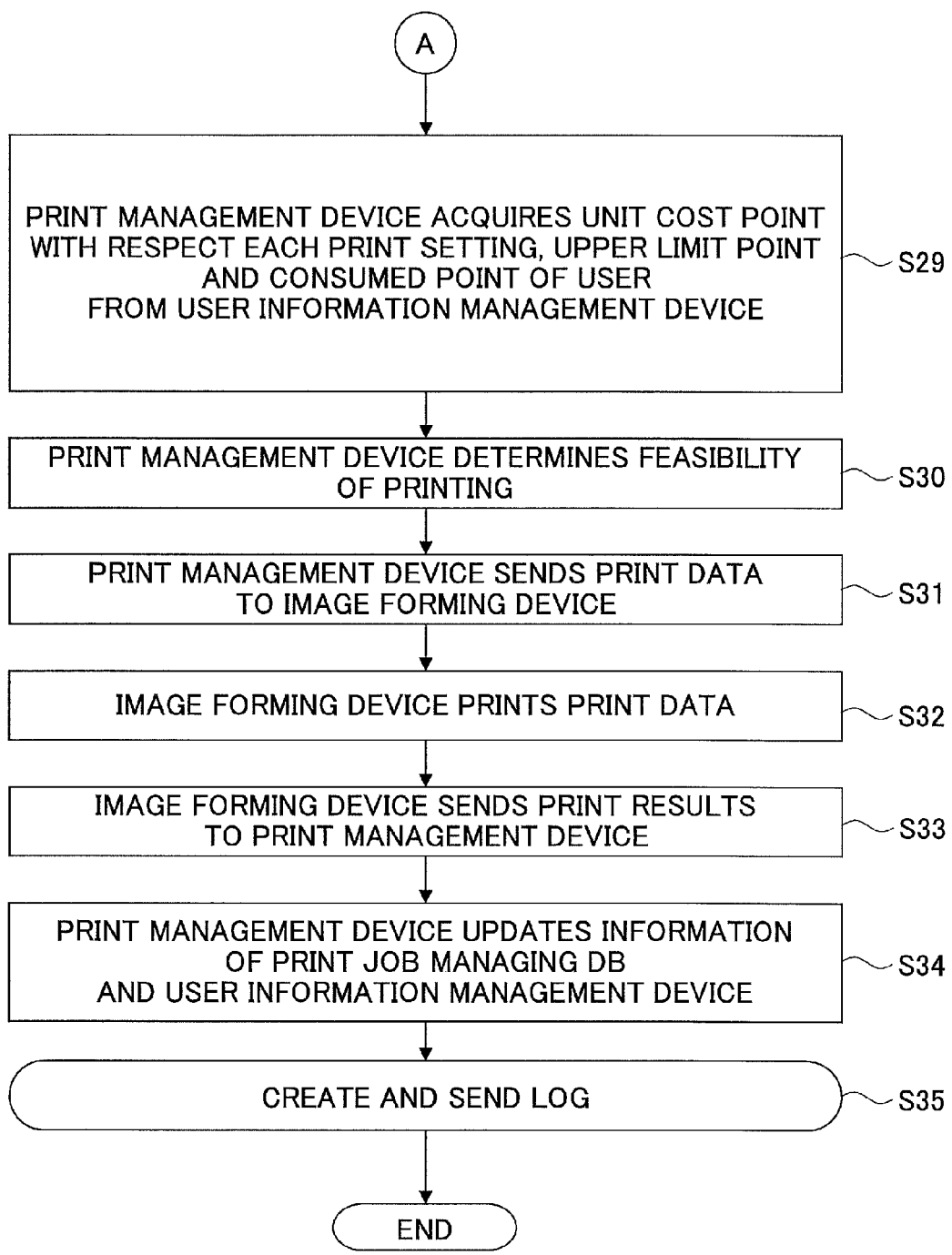
FIG. 14B is a remaining part of the flowchart of the job acquiring and printing process.
Figure 15:
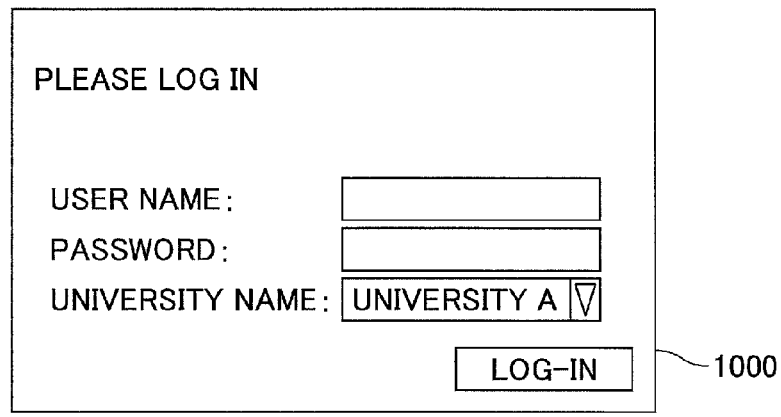
FIG. 15 is an illustration of a log-in screen.

FIG. 14A is a part of a flowchart of a job acquiring and printing process, and FIG. 14B is a remaining part of the flowchart of the job acquiring and printing process. A user operates the image forming device 22 to cause a log-in screen 1000 illustrated in FIG. 15 to be displayed on the operation panel 202 of the image forming device 22. FIG. 15 is an illustration of an image of the log-in screen.

The user inputs, in step S21, authentication information in the log-in screen 1000 displayed on the operation panel 202. It should be noted that the log-in screen 1000 illustrated in FIG. 15 is an example of a screen through which a user ID and a password is input and a name of a university associated with a tenant ID is selected.

The names of the universities selectable through the log-in screen 1000 are determined using the coordinate tenant information illustrated in FIG. 10. For example, in the case of the coordinate tenant information illustrated in FIG. 10, the image forming device 22 of the university B having the tenant ID "10001" displays the log-in screen 1000 through which the university A having the tenant ID "10001" and the university D having the tenant ID "10003" that are associating universities are selectable.

Acquisition of the coordinate tenant information corresponding to the tenant ID of the image forming device 22 may be performed at a time when displaying the log-in screen in response to the user operation, or may be performed previously (periodically). For example, the image forming device 22 can acquire the coordinate tenant information corresponding to the tenant ID by sending the tenant ID retained in the image forming device 22 itself to the print management system 10.

Alternatively, the image forming device 22 may acquire the coordinate tenant information from the print management system 10 by sending a device ID for identifying a device, such as its own serial number, to the print management device 32.

In such a case, the image forming device 22 must retain the device ID for identifying its own serial number. Additionally, the print management system 10 manages the tenant ID and the device ID in association with each other, and acquires the coordinate tenant information base on the tenant ID associated with the device ID received from the image forming device 22.

Additionally, although the log-in screen 1000 illustrated in FIG. 15 causes a user to select a university name in consideration of user' convenience, it may cause a user to select a tenant ID or cause a use to input a tenant ID. According, organization identification information for identifying the organization information (tenant ID) may be information which can identify the organization information such as a university name associated with the organization information, or may be the organization information itself.

If a user inputs the tenant ID, a process of determining whether the input tenant ID and the tenant ID retained by the image forming device 22 are managed with the same group ID in the print management system 10 is performed based the coordinate tenant information. If they are not managed with the same group ID, the print management system 10 causes an execution of printing using the upper limit point to be not permitted even if the user authentication is successful.

After inputting authentication information in the login screen 1000, the user requests log-in by, for example, depressing a log-in button. The operation panel displaying part 72 of the information forming device 22 is requested for logging in by the user.

Then, the communication processing part 74 of the image forming device 22 notifies the print management device 32 provided in the print management system 1 of the authentication information (user ID, password, university name, etc.), and requests an authentication.

The reverse proxy 11 of the print management system 10 causes the image forming device 22 to access the authenticating part 82 of the authentication device 31 because the image forming device 22 does not have the authentication ticket. The authenticating part 32 receives, in step S23, the authentication information (user ID, password, university name, etc.) sent from the image forming device 22. The authenticating part 82 authenticates the received authentication information. Specifically, the authenticating part 82 acquires the tenant ID corresponding to the received university name from the university name received from the image forming device 22 and the tenant information stored in the user information management device 33. The authenticating part 82 makes a determination as to whether the authentication is successful by determining whether information coincident with the combination of the received user ID and password exists in the user information stored in the user information management device 33. If the authentication is successful, the authenticating part 82 issues an authentication ticket to the image forming device 22.

The reverse proxy 11 of the print management system 11 causes, in step S24, the image forming device 22 to which the authentication ticket has been issued to access the print management device 32. The print job managing part 52 of the print management device 32 creates a print jog list of print jobs for which the accessing user has been registered by referring to the print job managing DB. Specifically, the print job managing part 52 creates a print job list of the print jobs associated with the tenant ID and the user ID of the authenticated user from among the print jobs registered in the print job managing DB. Then, the print job managing part 52 of the print management device 32 sends the authentication ticket and the print job list to the image forming device 22, which has accessed the print management device 32.

The operation panel displaying part 72 of the image forming device 22 displays the print job list received the print management device 32 on the operation panel 202. The user selects, in step S26, the print job which the user desires to print out from the print job list displayed on the operation panel 202. The operation panel displaying part 72 of the image forming device 22 notifies, in step S27, the print management device 22 of the print job selected by the user. The print job managing part of the print management device 32 acquires, in step S28, the print setting and the print number notified by image forming device 22 from the print job managing DB.

The print feasibility determining part 53 of the print management device 32 acquires, in step S29, a unit cost point from the unit cost point information (refer to FIG. 11) stored in the user information management device 33. Moreover, the print feasibility determining part 53 of the print management device 32 acquires the upper limit point and the consumed point from the user information (refer to FIG. 9) stored in the user information management device 33.

The print feasibility determining part 53 of the print management device 32 determines, in step S30, whether printing is feasible based on the unit cost point, upper limit point and consumed point with respect to each print setting acquired in the process of step S29, as mentioned later. The print feasibility determining part 53 of the print management device 32 notifies the print job managing part 52 of a result of the determination.

The description is continued below of a process subsequent to step S31 after the result of determination that printing is feasible is notified. If the result of determination that printing is not feasible, the process of step S31 and subsequent steps is not performed.

The print job managing part 52 of the print management device 32 acquires, in step S31, the print data of the print job selected by the user from the print job managing DB, and sends the acquired print data to the image forming device 22. The print processing part 73 of the image forming device 22 prints out, in step S32, the print data.

The communication processing part 74 of the image forming device 22 sends, in step S33, the print results to the print management device 32. Then, the print job managing part 52 of the print management device 32 perform, in step S34, a process of updating information stored in the print job managing DB and the user information management device 33 based on the print results sent from the image forming device 22. For example, the print job managing part 52 updates state information of the print job stored in the print job managing DB. Additionally, the print job managing part 52 updates the consumed point of the user information stored in the user information management device 33.

The log creating part 54 of the print management device 32 creates, in step S35, the log information such as illustrated in FIG. 12 based on the print results received from the image forming device 22, and sends the acquired log information to the log management device 34 so as to have the log management device 34 to manage the log information.

According to the job acquiring and printing process illustrated in FIGS. 14A and 14B, the user can have the image forming device 22 to print a desired image by acquiring the print job including the print data of the desired image from the print management system 10. It should be noted that if a notification of the determination result that printing is not feasible in the process of step S30, the process may proceeds to a printing process according to a payment in cash.

Figure 16:
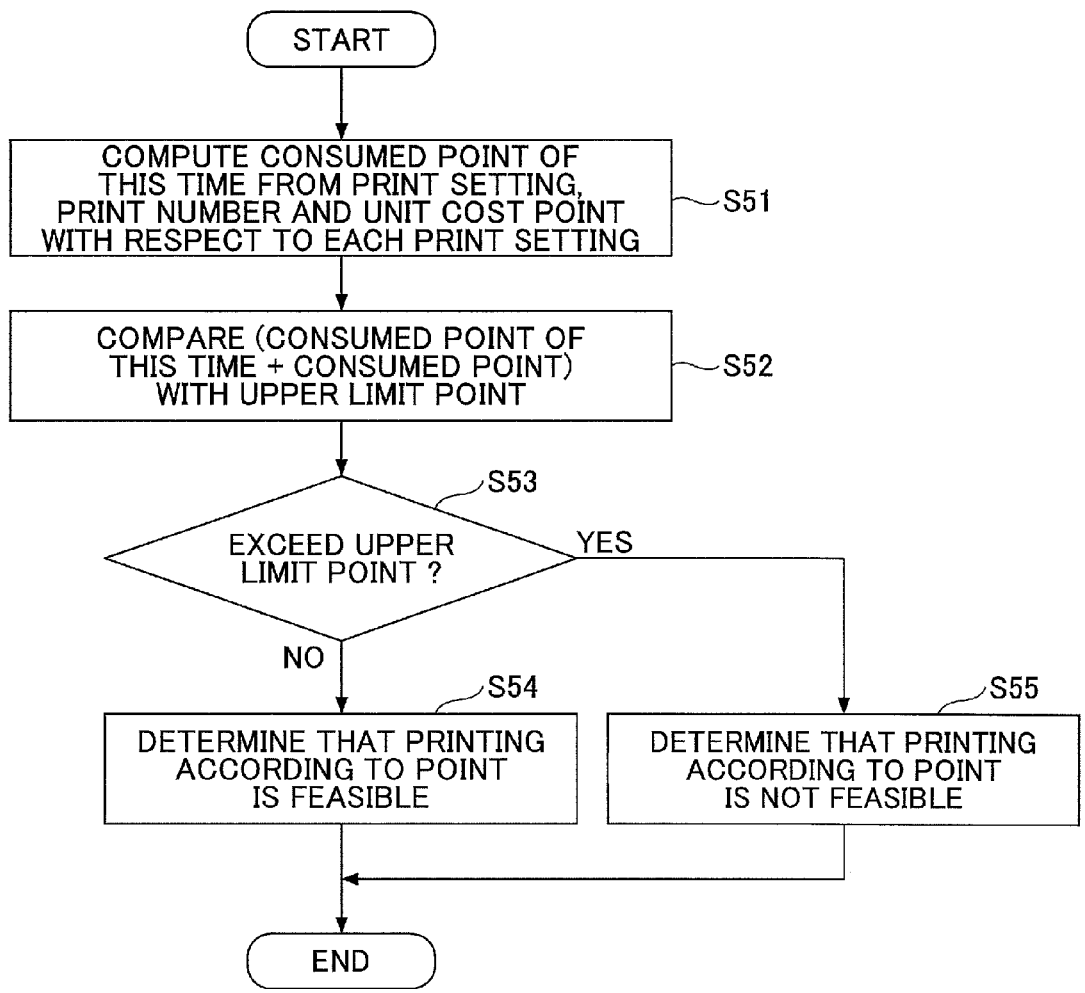
FIG. 16 is a flowchart of a print feasibility determining process.

FIG. 16 is a flowchart of a print feasibility determining process. The print feasibility determining part 53 of the print management device 32 computes, in step S51, the consumed point of this time based on the print setting, the print number and the unit cost point with respect to each print setting. For example, in the case of the unit cost point illustrated in FIG. 11, if the number of sheets to print (print number) is one and the print setting is "monochrome (A3-size or larger)", the consumed point is computed as "one sheet×unit cost point "2"=2".

The print feasibility determining part 53 compares, in step S52, a present consumed point, which is acquired by adding the consumed point at this time calculated in the process of step S52 to the consumed point acquired from the user information, with the upper limit point acquired from the user.

The print feasibility determining part 53 determines, in step S53, whether the present consumed point, which is acquired by adding the consumed point at this time calculated in the process of step S52 to the consumed point acquired from the user information, exceeds the upper limit point acquired from the user.

If the present consumed point at this time does not exceed the upper limit point, the print feasibility determining part 53 determines, in step S54, that the printing according to point consumption is feasible. If the present consumed point exceeds the upper limit point, the print feasibility determination processing part 53 determines, in step S55, that the printing according to point consumption is not feasible.

According to the print feasibility determining process illustrated in FIG. 16, even in a case where a student of the university A uses the image forming device 22 of the university B, the print management system 10 can provide a printing service according to point consumption to the student (a user) in a range not exceeding the upper limit point. That is, the print management system 10 can provide the print managing function over a plurality of universities.

<Summary>

According to the information processing system 1 of the present embodiment, the print managing function can be provided over organizations and groups such as universities and companies.

In recent years, the number of universities cooperating with each other and introducing a system allowing students to take lectures or lessons of other universities has increased. Accordingly, the students desire to use the printing service such as printing according to point consumption or pull-printing in the same manner as in their own university when the students visit other universities.

Conventionally, there is no coordination between the print management systems among universities each of which performs a print management, a print restriction and a print charge according to its own independent print management system. Thus, the printing service such as printing according to point consumption and pull-printing cannot be used.

In consideration of such a situation, it is desirable to provide a print management system in which a print service such as printing according to point consumption and pull-printing can be provided over a plurality of universities, colleges and schools. Thus, according to the information processing system 1 according to the present embodiment, the print management system 10 is caused to be usable commonly by a plurality of universities, colleges and schools by using a cloud service or the like so that the print management, the print restriction, the print charge etc., can be materialized over the plurality of universities, colleges and schools.

For example, according to the information processing system 1 of the present embodiment, printing according to point consumption and pull-printing can be materialized even when a student of the university A performs printing by using the image forming device 22 of the university B. Moreover, according to the information processing system 1 of the present embodiment, both the log information of printing by the information forming device 22 of the university A by a student of the university A and the log information of printing by the information forming device 22 of the university B by the student of the university A can be managed at once. Furthermore, each university does not necessarily prepare an independent print management system.

It should be noted that although the above described embodiment is directed to the upper limit management in printing in the present embodiment, the present embodiment is not limited to the printing function or the print application. For example, the present embodiment may be directed to a scanning function or an optical character reading (OCR) function, and may also be directed to other functions.

That is, the scope of the present embodiment is not limited by the function used, and the present embodiment may be applicable to a use form if an upper limit management corresponding to an amount of use is performed therein. Further, the method use restriction is not limited to the method of upper limit management, and the present embodiment is applicable to other use restriction methods.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as flexible magnetic disk, hard disc, CD-ROM, magnetic tape device or solid state memory device. The computer software can be provided to the programmable apparatus using any non-transient recording medium for recording processor readable code, such as a flexible magnetic disk, hard disk, CD-ROM, magnetic tape, solid-state memory, etc. The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of CPU can serve as a physical memory or main memory of the apparatus, whereas the HDD can serve as a secondary memory of the apparatus.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A process management system comprising:
   an information processing apparatus connected to a plurality of networks each of which is provided in respective one of organizations to which a plurality of users belong and having a processing device to be used by the users, each organization belonging to one of a plurality of groups,
   wherein the information processing apparatus includes a computer that executes a program to perform a managing process to manage a process performed by the processing devices in the networks, the managing process including:
   managing one or more users that belong to an organization based on user management information including organization information, user information and upper limit management information by associating with each other, said organization information, user information and upper limit management information being associated with each other in the user management information, the organization information for uniquely identifying each of the organizations, the user information for uniquely identifying each of the users each organization, the upper limit management information for managing an upper limit of an amount of process performed by each processing device for the each of the users;

holding coordinate organization information to manage a plurality of groups of the organization information;

specifying an organization information that belongs to a same group as a group of organization information of an organization that manages a processing device that is used by the each of the users;

receiving:
- first specifying information that is input by a user that uses a processing device, said first specifying information specifying an organization of the user,
- the user information, and
- second specifying information that specifies an organization that manages the processing device;

authenticating a login from the processing device that belongs to an organization different from that of the user when first and second conditions are met,
- the first condition being met when first organization information that is specified based on the first specifying information and second organization information that is specified based on the second specifying information are managed in the same group, and
- the second condition being met when the specified first organization information and the received user information are authenticated based on the user management information, and acquiring when a user, who is managed in the same group as a desired processing device and whose login is authenticated, makes a process request at the desired processing device, the upper limit management information from the user management information, and determining whether the process requested by the user is executable within the upper limit amount of process given to the user based on the acquired upper limit management information.

2. The process management system as claimed in claim 1, wherein
the managing user management information includes managing upper limit management information including upper limit information and consumed amount information, and
the determining to perform the process includes determining to perform the process, when determining that the consumed amount information does not exceed the upper limit information, by reflecting an amount of the process to be performed by the processing device according to the process request made by the one of the users in the consumed amount information, based on the upper limit information and the consumed amount information associated with the organization information and the user information of the one of the users.

3. The process management system as claimed in claim 1, wherein
the managing process further includes computing a consumed amount of process, when the process requested by the one of the users is performed, based on unit cost point information representing an amount of process required by each processing device to perform a unit amount of operation.

4. The process management system as claimed in claim 1, wherein the managing process further includes managing, after the process requested by the one of the users is performed, log information of the process by associating the organization information and the user information of the one of the users who requested the process with the organization information of the processing device performing the process.

5. An information processing apparatus connected to a plurality of networks each of which is provided in respective one of organizations to which a plurality of users belong and having a processing device to be used by the users, each organization belonging to one of a plurality of groups, the information processing apparatus comprising a computer that executes a program to perform a managing process to manage a process performed by the processing devices in the networks, the managing process including:

managing one or more users that belong to an organization based on user management information including organization information, user information and upper limit management information by associating with each other, said organization information, user information and upper limit management information being associated with each other in the user management information, the organization information for uniquely identifying each of the organizations, the user information for uniquely identifying each of the users of each organization, the upper limit management information for managing an upper limit of an amount of processing performed by each processing device for the each of the users;

holding coordinate organization information to manage a plurality of groups of the organization information;

specifying an organization information that belongs to a same group as a group of organization information of an organization that manages a processing device that is used by the each user;

receiving:
- first specifying information that is input by a user that uses a processing device, said first specifying information specifying an organization of the user,
- the user information, and
- second specifying information that specifies an organization that manages the processing device;

authenticating a login from the processing device that belongs to an organization different from that of the user when first and second conditions are met,
- the first condition being met when first organization information that is specified based on the first specifying information and second organization information that is specified based on the second specifying information are managed in the same group, and
- the second condition being met when the specified first organization information and the received user information are authenticated based on the user management information, and acquiring, when a user, who is managed in the same group as a desired processing device and whose login is authenticated, makes a process request at the desired processing device, the upper limit management information from the user management information, and determining whether the process requested by the user is executable within the upper limit amount of process given to the user based on the acquired upper limit management information.

6. The information processing apparatus as claimed in claim 5, wherein
the managing user management information includes managing upper limit management information including upper limit information and consumed amount information, and
the determining to perform the process includes determining to perform the process, when determining that the consumed amount information does not exceed the upper limit information, by reflecting an amount of the process to be performed by the processing device according to the process request made by the one of the users in the consumed amount information, based on the upper limit information and the consumed amount information associated with the organization information and the user information of the one of the users.

7. The information processing apparatus as claimed in claim 5, wherein the managing process further includes computing a consumed amount of process, when the process requested by the one of the users is performed, based on unit cost point information representing an amount of process required by each processing device to perform a unit amount of operation.

8. The information processing apparatus as claimed in claim 5, wherein the managing process further includes managing, after the process requested by the one of the users is performed, log information of the process by associating the organization information and the user information of the one of the users who requested the process with the organization information of the processing device performing the process.

9. An information processing system comprising:

an information processing apparatus connected to a plurality of networks each of which is provided in respective one of organizations to which a plurality of users belong; and a plurality of processing devices to be used by the users, each of the processing devices being connected to the information processing apparatus managed by respective one of the organizations each of which belongs to one of a plurality of groups, wherein the information processing apparatus includes a computer that executes a program to perform a managing process to manage a process performed by the processing devices in the networks, the managing process including:

managing one or more users that belong to an organization based on user management information including organization information, user information and upper limit management information by associating with each other, said organization information, user information and upper limit management information being associated with each other in the user management information, the organization information for uniquely identifying each of the organizations, the user information for uniquely identifying each of the users of each organization, the upper limit management information for managing an upper limit of an amount of processing performed by each processing device for the each of the users;

holding coordinate organization information to manage a plurality of groups of the organization information;

specifying an organization information that belongs to a same group as a group of organization information of an organization that manages a processing device that is used byte each user;

receiving:

first specifying information that is input by a user that uses a processing device, said first specifying information specifying an organization of the user, the user information, and second specifying information that specifies an organization that manages the processing device;

authenticating a login from the processing device that belongs to an organization different from that of the user when first and second conditions are met, the first condition being met when first organization information that is specified based on the first specifying information and second organization information that is specified based on the second specifying information are managed in the same group, and the second condition being met when the specified first organization information and the received user information are authenticated based on the user management information, and acquiring, when a user, who is managed in the same group as a desired processing device and whose login is authenticated, makes a process request at the desired processing device, the upper limit management information from the user management information, and determining whether the process requested by the user is executable within the upper limit amount of process given to the user based on the acquired upper limit management information.

10. The information processing system as claimed in claim 9, wherein the managing user management information includes managing upper limit management information including upper limit information and consumed amount information, and the determining to perform the process includes determining to perform the process, when determining that the consumed amount information does not exceed the upper limit information, by reflecting an amount of the process to be performed by the processing device according to the process request made by the one of the users in the consumed amount information, based on the upper limit information and the consumed amount information associated with the organization information and the user information of the one of the users.

11. The information processing system as claimed in claim 9, wherein the managing process further includes computing a consumed amount of process, when the process requested by the one of the users is performed, based on unit cost point information representing an amount of process required by each processing device to perform a unit amount of operation.

12. The information processing system as claimed in claim 9, wherein the managing process further includes managing, after the process requested by the one of the users is performed, log information of the process by associating the organization information and the user information of the one of the users who requested the process with the organization information of the processing device performing the process.

* * * * *